United States Patent
Shin

(10) Patent No.: US 8,055,427 B2
(45) Date of Patent: Nov. 8, 2011

(54) METHOD AND APPARATUS FOR SPEED-LIMIT FOLLOWING CRUISE CONTROL

(75) Inventor: Kwang-Keun Shin, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 536 days.

(21) Appl. No.: 12/337,817

(22) Filed: Dec. 18, 2008

(65) Prior Publication Data

US 2010/0161195 A1  Jun. 24, 2010

(51) Int. Cl.
G06F 7/00 (2006.01)
(52) U.S. Cl. ............... 701/93; 180/179; 477/186
(58) Field of Classification Search .......... 701/93, 701/96, 300; 180/170, 178, 179; 477/182–186
See application file for complete search history.

(56) References Cited

U.S. PATENT DOCUMENTS

| | | | |
|---|---|---|---|
| 5,173,859 A | 12/1992 | Deering | |
| 6,076,622 A | 6/2000 | Chakraborty et al. | |
| 6,374,173 B1 | 4/2002 | Ehlbeck | |
| 6,470,256 B1 | 10/2002 | Cikalo et al. | |
| 6,496,771 B2 | 12/2002 | Hattori et al. | |
| 6,687,595 B2 | 2/2004 | Seto et al. | |
| 6,728,605 B2* | 4/2004 | Lash et al. | 701/1 |
| 6,778,897 B2 | 8/2004 | Ibrahim | |
| 6,865,471 B2 | 3/2005 | Konishi et al. | |
| 7,092,811 B2 | 8/2006 | Ishizu et al. | |
| 7,226,387 B2 | 6/2007 | Thompson et al. | |
| 7,280,903 B2 | 10/2007 | Arai et al. | |
| 2001/0046926 A1 | 11/2001 | Adachi et al. | |
| 2002/0099491 A1 | 7/2002 | Akabori et al. | |
| 2002/0161506 A1 | 10/2002 | Ishizu et al. | |
| 2003/0004644 A1 | 1/2003 | Farmer | |
| 2004/0084237 A1 | 5/2004 | Petrie, Jr. | |
| 2004/0181323 A1 | 9/2004 | Yuan et al. | |
| 2004/0222762 A1 | 11/2004 | Maslov et al. | |
| 2005/0075826 A1 | 4/2005 | Kitazawa | |
| 2006/0229792 A1 | 10/2006 | Kawazoe et al. | |
| 2007/0198191 A1 | 8/2007 | Olney et al. | |
| 2007/0265759 A1 | 11/2007 | Salinas et al. | |

* cited by examiner

Primary Examiner — Richard M. Camby

(57) ABSTRACT

A method is provided for automatically transitioning a cruise control speed from a current speed zone to a next speed zone. A location at which the speed zone limit changes from the current speed limit to the next speed limit forward of a driven vehicle is determined. A speed profile is determined for changing the vehicle speed from the current speed limit to the next speed limit. The speed profile includes non-linear changes in the vehicle speed between the current speed zone and the next speed zone for eliminating abrupt changes in the vehicle speed. A relative location is determined for initiating the non-linear changes in the speed of the vehicle. The non-linear changes are actuated in the speed of the vehicle at the relative location for gradually changing the speed to the next speed limit.

20 Claims, 3 Drawing Sheets

METHOD AND APPARATUS FOR SPEED-LIMIT FOLLOWING CRUISE CONTROL

BACKGROUND OF INVENTION

An embodiment relates generally to cruise control systems.

Cooperative speed control systems include decreasing a speed of the vehicle at a distance in front of a caution zone, such as an intersection, crosswalk, school zone, and then increases the speed to the required speed following the crossing zone. Such systems will travel at a constant speed limit of the vehicle road until it nears the caution zone. At a distance preceding the caution zone, such systems abruptly initiate a linear deceleration until the speed reaches the caution zone speed. At that time, the vehicle speed is abruptly changed to the caution zone speed limit. When the vehicle exits the caution zone, the vehicle system abruptly initiates a linear speed change until the speed reaches the speed limit of the vehicle road. Upon reaching the speed limit, the speed of the vehicle is abruptly changed to the vehicle speed the vehicle was traveling prior to the caution zone. The issue with such systems is that when the vehicle transitions to and from a caution zone speed, a linear change in velocity is applied which produces jerking of the vehicle as felt by the driver. The jerk or abrupt surges in the vehicle dynamics felt by the driver is the direct result of abrupt braking or abrupt vehicle acceleration that is a result of transitioning directly transitioning the vehicle speed between a constant velocity and a linear deceleration or linear acceleration or the increase in acceleration to a higher speed. Such occurrences are nuisances to the driver of the vehicle.

SUMMARY OF INVENTION

An advantage of an embodiment of the invention is the automatic and gradual changing of the vehicle speed from a current speed to a speed limit of a next speed zone, in addition to, elimination of jerking the vehicle as felt by the driver when the vehicle autonomously transitions from the current speed limit to a next speed limit while the vehicle travels in cruise control mode.

An embodiment contemplates a method of automatically transitioning a cruise control speed from a current speed zone to a next speed zone. A location at which the speed zone limit changes from the current speed limit to the next speed limit forward of a driven vehicle is determined. A speed profile is determined for changing the vehicle speed from the current speed limit to the next speed limit. The speed profile includes non-linear changes in the vehicle speed between the current speed zone and the next speed zone for eliminating abrupt changes in the vehicle speed. A relative location is determined for initiating the non-linear changes in the speed of the vehicle. The non-linear changes are actuated in the speed of the vehicle at the relative location for gradually changing the speed to the next speed limit.

An embodiment contemplates a speed control vehicle system. A controller is adapted to receive a map data signal indicative of a distance to a next speed limit zone, a signal indicative of a current speed limit, a signal indicative of a next speed limit, and a signal indicative of the current vehicle speed. The controller determines a location at which the speed zone limit changes from the current speed limit to the next speed limit forward of a driven vehicle in response to the map data signal. The controller determines a speed profile for changing the speed from the current speed limit to the next speed limit. The speed profile includes a non-linear change in the vehicle speed between the current speed zone and the next speed zone to eliminate abrupt changes in the vehicle speed. The controller determines a relative location for initiating the non-linear change in speed of the vehicle. The controller is configured for actuating the non-linear change of speed of the vehicle at the relative location for the gradually changing in the vehicle speed to the next speed limit.

DETAILED DESCRIPTION

Figure 1:
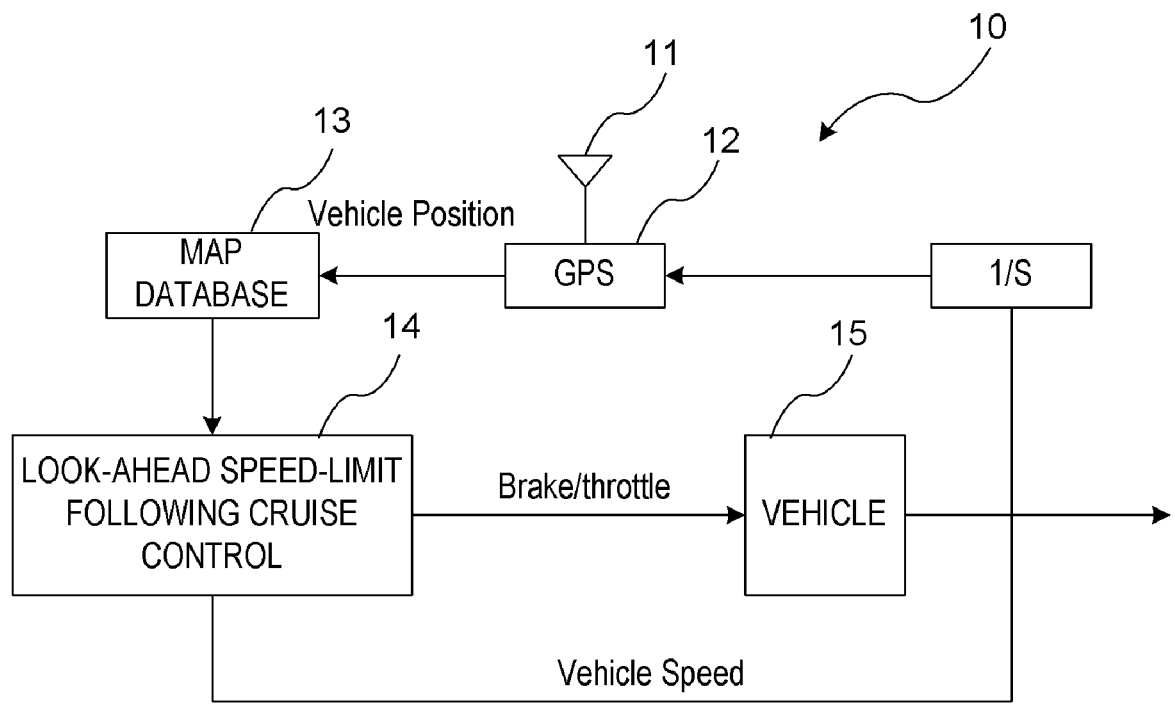
FIG. 1 is a block diagram of a vehicle speed cruise control system.

There is shown generally in FIG. 1 a block diagram of a vehicle speed cruise control system 10 for changing the vehicle speeds when transitioning between speed zones. An antenna 12 is coupled to a GPS receiver 14 for receiving wireless signal from a GPS transmitting device remote from the vehicle for providing a vehicle position of the driven vehicle. The GPS receiver 14 is coupled to a map database 16. Map data is imported from the map database 16 for identifying the position of the vehicle in relation to its location thereby identifying the roads and other map information surrounding the driven vehicle. The map data identifies roadways and speed limit information of the traveled roadways. Distance to crossroads as well as distance to when a speed zone limit changes are determined and identified in the map data.

The GPS 14 generates a vehicle's current position and the map database 16 matches the vehicle position with the map data to extract the speed limit for the current position of the vehicle. The map database 16 also predicts the vehicle path and extracts the next speed-limit zone, and distance to the starting point of the next speed-limit zone.

A look-ahead speed limiting module 18 is provided to regulate the speed of the vehicle as a change in a speed zone is encountered while vehicle cruise control is actuated. The change in the speed of the vehicle is automatically controlled by the powertrain controls, the braking controls, or a combination of both. The vehicle should be preferably equipped with a brake control module which allows braking to be applied to the vehicle brakes independent of a driver of the vehicle applying a force to the brake pedal.

A simple way of achieving the speed limit following feature would be to follow the speed limit while in the current location; however, this would result in the vehicle changing the speed once the vehicle is already in the speed zone. This methodology works properly when the speed limit increases when transitioning from a speed zone with a speed limit lower than a next speed zone limit since there is no implication of a vehicle traveling at a speed limit below the posted speed limit. Conversely, increasing vehicle speed above a posted speed limit prior to reaching the speed zone of a higher speed limit poses a risk of violating the posted speed limit of current speed zone.

In regards to entering a next speed zone with a lower speed limit relative to the current speed zone, it is essential to comply with traffic speed limits. Therefore, the vehicle speed should be reduced prior to reaching the next speed zone so that the vehicle is traveling the speed limit of the upcoming speed zone upon reaching the next speed zone. The look-ahead speed limiting module 18 provides the functionality of reducing the speed of the vehicle to the speed limit of the approaching speed limit zone such that the vehicle is traveling at the new posted speed limit upon reaching the location where the speed limit changes. Moreover, the look-ahead speed limiting module 18 determines a speed profile that the vehicle follows which includes non-linear changes in the vehicle speed between the current speed zone and the next speed zone for eliminating abrupt changes the vehicle speed. Current cruise control systems utilize linear changes in the vehicle speed, and as a result of the linear ramping of the vehicle velocity from the starting speed to the ending speed, abrupt changes in the speed are felt. The response that is felt by the driver is a jerk in the vehicle dynamics. The look-ahead speed limiting module 18 reduces the jerks felt by the driver by applying a non-linear change in speed so that the speed is gradually changed which avoids any abrupt changes felt by the driver of the vehicle.

Figure 2:
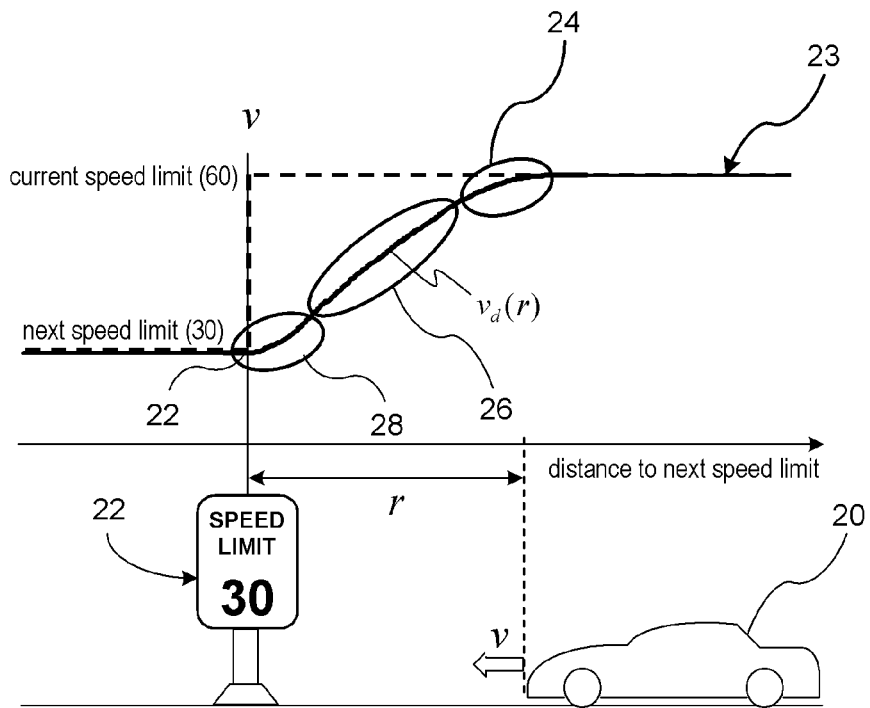
FIG. 2 is a graph of a desired speed control profile curve.

FIG. 2 illustrates an example of a desired speed control profile for a look ahead deceleration control. A vehicle 20 is shown traveling along a road at a posted speed limit (e.g. 60 mph). A next speed zone 22, designated by a 30 mph speed limit sign, is a distance (r) ahead of the driven vehicle. As a result, the vehicle gradually reduces the vehicle speed within the distance (r) for achieving the new speed limit at a point where the vehicle reaches the next speed zone 22.

A desired speed distance profile is shown generally at 23, in FIG. 2. The vehicle travels along at the current speed limit of 60 mph. At the distance (r) from the speed limit change, the look-ahead speed limiting module initiates a speed reduction. In a first stage of vehicle deceleration generally designated by 24, gradual braking is applied for producing a non-linear change in speed. The non-linear change in the vehicle speed is subtle enough to avoid any jerk in the vehicle dynamics. The deceleration of the vehicle is gradually and monotonically increased to a peak deceleration. Thereafter, a second stage of vehicle deceleration, generally designated by 26, is initiated. In the second stage of vehicle deceleration, constant braking (i.e., constant deceleration) is applied to the vehicle brakes over a predetermined distance traveled by the vehicle thereby further reducing the speed of the vehicle. Prior to reaching the next speed zone 22, a third stage of vehicle deceleration, generally designated by 28, is initiated. In the third stage of the vehicle deceleration, the vehicle brakes are gradually disengaged for applying a gradual and monotonically decreasing deceleration to the vehicle prior to reaching the next speed zone 22. The deceleration of the vehicle is monotonically decreased until the deceleration is zero and the vehicle is traveling at the new speed limit. The new speed is reached substantially at the same time the when the vehicle reaches the next speed zone 22 (i.e., the distance (r) is zero).

To apply speed control when the speed limit increases from the current speed zone to the next speed zone, the look-ahead speed limiting module 18 waits until the vehicle reaches the next speed zone. Once the next speed zone is reached, an increase in the vehicle speed is initiated; otherwise, if an increase in speed occurred prior to reaching the next speed zone, then the vehicle speed would exceed the posted speed limit of the current speed zone. Once the vehicle reaches the next speed zone (i.e., higher speed zone limit), look-ahead speed limiting module 18 increases the vehicle speed monotonically using a gradually increasing positive acceleration. The gradual increasing positive acceleration results in a non-linear velocity change for reducing acceleration surges felt by the driver. In a next stage the vehicle applies a constant positive acceleration for increasing the speed of the vehicle. Prior to the vehicle reaching the posted speed limit, the positive acceleration generated by the powertrain system is gradually reduced until the posted vehicle speed limit is achieved. The positive acceleration generated in this third stage is a non-linear velocity change which reduces jerks which otherwise may be felt by the driver when the speed of the vehicle is abruptly changed.

Figure 3:
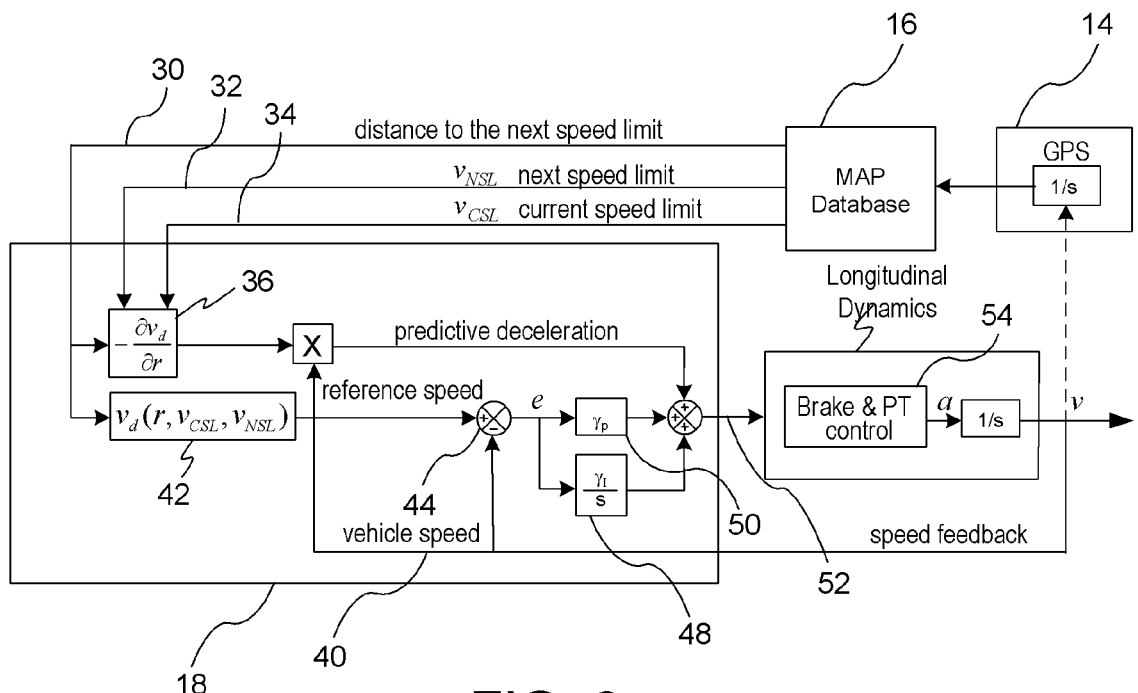
FIG. 3 is a block diagram of a look-ahead speed limiting module for the vehicle cruise control system.

FIG. 3 illustrates a detailed control block diagram of the vehicle speed cruise control system 10. The control algorithm requires three input variables, specifically, the current speed limit 30, the next speed limit 32, and the distance to the starting point of the next speed zone 34. Each of the respective inputs are obtained by the map database 16 and provided to the look-ahead speed limiting module 18. A controller design for the look-ahead speed limiting module 18 will be described herein. To design the controller, the following longitudinal dynamics are assumed:

$$\ddot{r} = -a_c \quad (1)$$

where r is the range and $a_c$ is the acceleration command.

Therefore, the speed error s which is the error between the desired speed and the actual speed v is represented by the following equation:

$$s = v_d(r) - v \quad (2)$$

where $v_d(r)$ is the desired speed-distance profile, and v is the actual vehicle speed.

If the error is zero (i.e., if the vehicle travels at a speed other than the posted speed limit), then the longitudinal dynamics of the vehicle is represented by the following equation:

$$v = v_d(r). \quad (3)$$

When the speed-range error (s) is not equal to zero, the controller attempts to bring the error to zero. To explain this concept, a Lyapunov function is defined in the following form:

$$V = \frac{1}{2}s^2 + \frac{1}{2}\gamma_1 q^2 \quad (4)$$

q is the integration of s, and is represented by the following equation:

$$\dot{q} = s. \quad (5)$$

The time derivative of the equation (4) is represented by the following equation:

$$\dot{V} = s\dot{s} + \gamma_1 q \dot{q}. \quad (6)$$

In addition, the time derivative of s in equation 2 is as follows:

$$\dot{s} = \frac{dv_d}{dr}(r)\dot{r} - \dot{v} = \frac{dv_d}{dr}(r)\dot{r} + \ddot{r}. \quad (7)$$

Substituting equation (5) and (7) into equation (6), the following equation is derived:

$$\dot{V} = s\left(\frac{dv_d}{dr}(r)\dot{r} + \ddot{r}\right) + \gamma_1 q s. \quad (8)$$

The system model of equation (1) is substituted into equation (8) to obtain the following:

$$\dot{V} = s\left(\frac{dv_d}{dr}(r)\dot{r} - a_c\right) + \gamma_1 q s \quad (9)$$

If we choose the following control law, $$a_C = \frac{dv_d(r)}{dr}\dot{r} + \gamma_p s + \gamma_I q, \quad (10)$$

then equation (9) becomes, $$\dot{V} = -\gamma_p s^2. \quad (11)$$

Therefore, the control law (10) with any positive $\gamma_p$ and $\gamma_I$ minimizes the error s. Once the trajectory is on the profile, the speed- and range remains on the profile.

The following conditions of $\dot{r}=-v$, $s=v_d(r)-v$, and $\dot{q}=s$ can be substituted in equation (10) to generate a control algorithm. The control algorithm can be re-written as:

$$a_C = -\frac{dv_d(r)}{dr}v + \gamma_p\{v_d(r)-v\} + \gamma_I \int_0^t \{v_d(r)-v\}dt \quad (12)$$

The control algorithm (12) is implemented as shown in FIG. 3. specifically, the look-ahead speed limiting module 18. The look-ahead speed limiting module 18 receives the current speed limit signal 30, the next speed limit signal 32, and the distance to the starting point of the next speed zone signal 34. Inputs 30, 32, and 34 are provided to block 36 for generating a spatial derivative of a speed-distance profile. The output of block 36 is provided to a multiplier 38 where it is combined with a speed feedback signal 40 relating to the current vehicle speed. A predictive acceleration/deceleration signal 40 is output from multiplier 38.

The input signal distance to the starting point of the next speed zone 34 is also input to block 42 for generating a speed-distance profile. The speed-distance profile is utilized as a reference speed input that is based on transitioning the vehicle speed from the speed limit of the current speed zone to the speed limit of the next speed zone over the determined distance. The reference speed signal output from block 42 is input to a multiplier 44 where the reference speed signal is combined with the speed feedback signal 40. The output of the multiplier 44 is provided to a proportional gain control ($\gamma_p$) 46 and an integrated gain control ($\gamma_I/s$) 48.

The predictive acceleration/deceleration signal 40, the output signal of the proportional gain control ($\gamma_p$) 46, and the integrated gain control ($\gamma_I/s$) 48 are provided to a multiplier 50. A final acceleration command ($a_c$) 52 is output from the multiplier 50. The final acceleration command ($a_c$) 52 is provided to one or more vehicle dynamic control modules 54, such as the brake control module and/or a powertrain control module for controlling the deceleration and acceleration of the vehicle for achieving the desired vehicle speed of the next speed zone.

Figure 4:
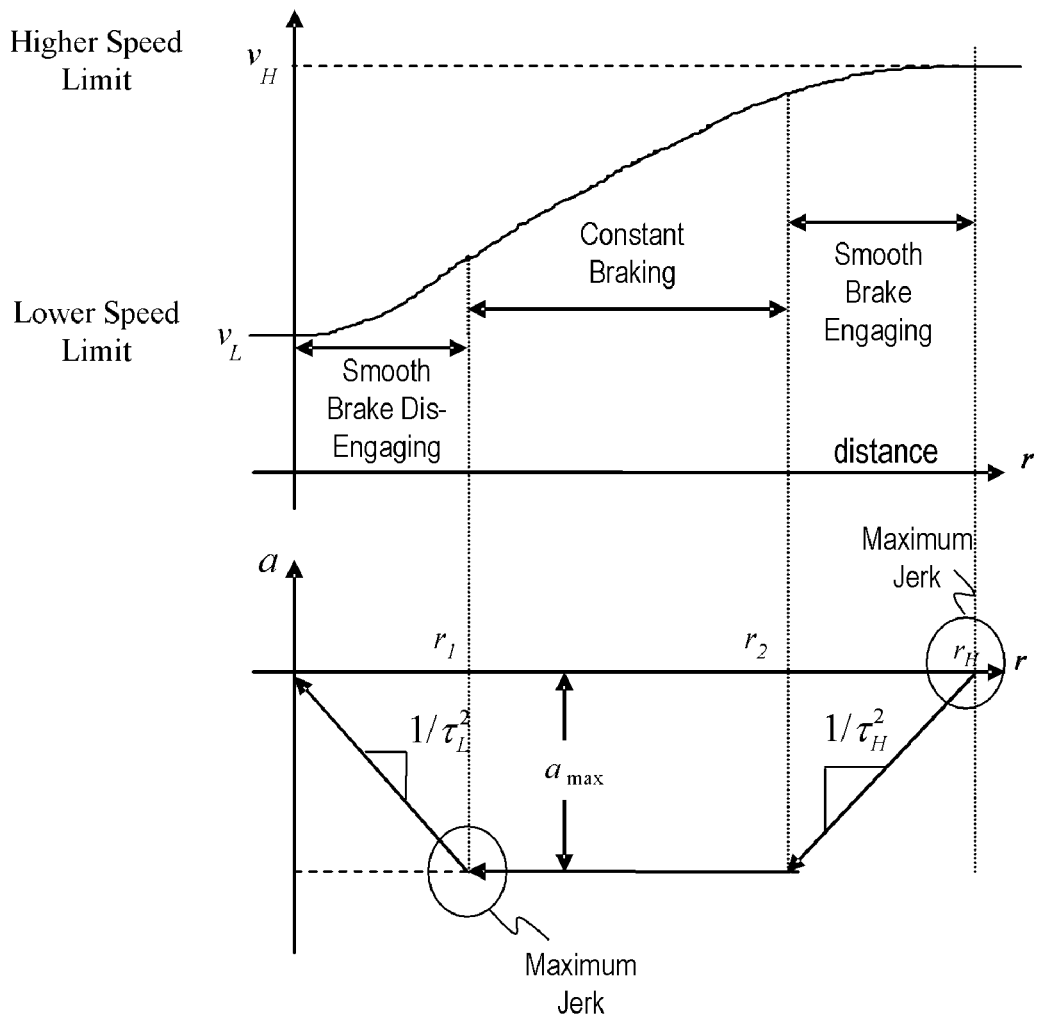
FIG. 4 is a graph of an acceleration profile curve for the vehicle speed cruise control system.

The speed distance profile is determined by limiting the maximum jerk and maximum braking. As the vehicle approaches the next speed zone at the respective posted speed (e.g., decelerating to a lower speed), the acceleration profile a(r) is designed based on the graph shown in FIG. 4. The acceleration profile is represented by the following equation:

$$a(r) = \frac{1}{\tau_L^2}<r> - \frac{1}{\tau_L^2}<r-r_1> - \frac{1}{\tau_H^2}<r-r_2> + \frac{1}{\tau_H^2}<r-r_H>, \quad (13)$$

and the corresponding speed-distance profile is expressed as:

$$v_d(r) = \sqrt{v_L^2 + \frac{1}{\tau_L^2}<r>^2 - \frac{1}{\tau_L^2}<r-r_1>^2 - \frac{1}{\tau_H^2}<r-r_2>^2 + \frac{1}{\tau_H^2}<r-r_H>^2}. \quad (14)$$

The speed-distance profile as shown in equation (14) should satisfy the following conditions:

$$v(0)=v_L, \text{ and} \quad (15)$$

$$v(r_H)=v_H. \quad (16)$$

Furthermore, the acceleration and jerk should be constrained such that the following conditions are satisfied:

$$|a(r)| \leq a_{max}, \quad (17)$$

$$\left|\frac{da}{dt}\right| = \left|\frac{da(r)}{dr}v_d(r)\right| < J_{max}, \quad (18)$$

By utilizing the conditions set forth in equations (15), (16), and (17), the following unknowns in equation (14) can be solved for:

$$\tau_L^2 = \frac{1}{2}\left(\frac{a_{max}}{J_{max}}\right)^2 + \sqrt{\frac{1}{4}\left(\frac{a_{max}}{J_{max}}\right)^4 + \left(\frac{v_L}{J_{max}}\right)^2}, \quad (19)$$

$$\tau_H^2 = \frac{v_H}{J_{max}}, \quad (20)$$

$$r_H = \frac{1}{2}\tau_H^2 a_{max} + \frac{1}{2}\tau_L^2 a_{max} + \frac{v_H^2 - v_L^2}{2a_{max}}, \quad (21)$$

$$r_2 = r_H - \tau_H^2 a_{max}, \quad (22)$$

$$r_1 = \tau_L^2 a_{max}, \quad (23)$$

Therefore, the speed derivative of the speed-distance profile is derived under the following conditions:

$$\frac{dv_d}{dr}(r) = \frac{\frac{1}{\tau_L^2}<r> - \frac{1}{\tau_L^2}<r-r_1> - \frac{1}{\tau_H^2}<r-r_2> + \frac{1}{\tau_H^2}<r-r_H>}{v_d(r)} \quad (24)$$

$$\text{(if } r > r_1\text{)}$$

$$\frac{dv_d}{dr}(r) = \frac{1}{\tau_L}(\text{if } r \leq r_1) \quad (25)$$

The known variables such as the distance to the next speed zone (r), the higher speed limit ($v_H$), the lower speed limit ($v_L$), the maximum acceleration ($a_{max}$), and the maximum jerk ($J_{max}$) are used as inputs to the look-ahead speed limiting module. The corresponding speed-distance profile and the speed derivative of the speed-distance profile are calculated based on the variable inputs. Resulting control signals are determined and are output to the vehicle dynamic control modules (e.g., brake control module and powertrain control module) for gradually changing the speed of the vehicle from the current traveled speed to the speed limit of the next speed zone. The above algorithm is executed while the vehicle is enabled under cruise control. The speed is automatically changed without any inputs or required action of by the driver of the vehicle. The advantage of the above algorithm is that non-linear changes are made to the vehicle speed when changing from the current speed and when achieving the speed of the next speed zone for eliminating jerks felt by the driver during abrupt vehicle decelerations and accelerations.

While certain embodiments of the present invention have been described in detail, those familiar with the art to which this invention relates will recognize various alternative designs and embodiments for practicing the invention as defined by the following claims.

What is claimed is:

1. A method of automatically transitioning a cruise control speed from a current speed zone to a next speed zone, the method comprising the steps of:
   determining a location at which the speed zone limit changes from the current speed limit to the next speed limit forward of a driven vehicle;
   determining a speed profile for changing the vehicle speed from the current speed limit to the next speed limit, the speed profile including non-linear changes in the vehicle speed between the current speed zone and the next speed zone for eliminating abrupt changes in the vehicle speed;
   determining a relative location for initiating the non-linear changes in the speed of the vehicle; and
   actuating the non-linear changes in the speed of the vehicle at the relative location for gradually changing the speed to the next speed limit.

2. The method of claim 1 wherein changing the speed from the current speed limit to the next speed limit includes a deceleration in vehicle speed.

3. The method of claim 2 wherein the relative location for initiating the non-linear change in speed of the vehicle is performed at a distance prior to reaching the location at which the speed zone limit changes.

4. The method of claim 3 wherein the initiating the non-linear change in speed includes decelerating the vehicle until the vehicle speed reaches the next vehicle speed, the next vehicle speed is obtained at the location where the speed zone limit changes from the current speed limit to the next speed limit.

5. The method of claim 4 wherein the deceleration is monotonically increasing to a peak and then monotonically decreasing to zero.

6. The method of claim 5 wherein the deceleration includes a constant deceleration between the periods when the deceleration monotonically increases to a peak deceleration and when the deceleration monotonically decreases to a deceleration of zero.

7. The method of claim 5 wherein vehicle brakes are engaged for initiating the non-linear change of speed of the vehicle prior to reaching the location where the speed zone limit changes.

8. The method of claim 6 wherein the time period when the deceleration monotonically decreases to zero is applied prior to reaching the location of the speed zone limit change for reducing abrupt changes in the vehicle speed.

9. The method of claim 8 wherein vehicle brakes are gradually disengaged for reducing the deceleration prior to the location where the speed zone limit changes.

10. The method of claim 1 wherein changing the vehicle speed from the current speed limit to the next speed limit includes a positive acceleration in vehicle speed.

11. The method of claim 10 wherein the relative location for initiating the non-linear change in speed of the vehicle is determined at the location at which the speed zone limit changes.

12. The method of claim 11 wherein a gradually increasing positive acceleration is applied at the initiation of the of the speed limit zone change.

13. The method of claim 12 wherein a constant positive acceleration is applied after the gradually increasing positive acceleration is applied.

14. The method of claim 13 wherein a gradually reducing positive acceleration is applied after the constant positive acceleration prior to reaching the next speed limit.

15. The method of claim 1 wherein the speed of the vehicle is changed by modifying powertrain controls.

16. The method of claim 15 wherein the speed of the vehicle is changed by applying braking controls.

17. The speed control vehicle system comprising:
   a controller adapted to receive a map data signal indicative of a distance to a next speed limit zone, a signal indicative of a current speed limit, a signal indicative of a next speed limit, and a signal indicative of the current vehicle speed;
   wherein the controller determines a location at which the speed zone limit changes from the current speed limit to the next speed limit forward of a driven vehicle in response to the map data signal, wherein the controller determines a speed profile for changing the speed from the current speed limit to the next speed limit, the speed profile including a non-linear change in the vehicle speed between the current speed zone and the next speed zone to eliminate abrupt changes in the vehicle speed, wherein the controller determines a relative location for initiating the non-linear change in speed of the vehicle, and wherein the controller is configured for actuating the non-linear change of speed of the vehicle at the relative location for the gradually changing in the vehicle speed to the next speed limit.

18. The apparatus of claim 17 further including a GPS receiver for obtaining a vehicle position.

19. The apparatus of claim 18 further comprising a map database for identifying the vehicle position relative to the speed zone change, the map database further providing speed zone limit data of the current speed zone and the next speed zone.

20. The method of claim 17 further comprising a braking control module for autonomously applying braking control to vehicle brakes for decelerating the vehicle in accordance with the speed profile.

* * * * *